(12) United States Patent
Stavridis et al.

(10) Patent No.: US 12,081,263 B2
(45) Date of Patent: Sep. 3, 2024

(54) METHODS, APPARATUS AND MACHINE-READABLE MEDIUMS RELATED TO WIRELESS COMMUNICATION IN COMMUNICATION NETWORKS

(71) Applicant: Telefonaktiebolaget LM Ericsson (publ), Stockholm (SE)

(72) Inventors: Athanasios Stavridis, Malmö (SE); Leif Wilhelmsson, Lund (SE); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 270 days.

(21) Appl. No.: 17/620,929

(22) PCT Filed: Jun. 24, 2019

(86) PCT No.: PCT/EP2019/066720
§ 371 (c)(1),
(2) Date: Dec. 20, 2021

(87) PCT Pub. No.: WO2020/259797
PCT Pub. Date: Dec. 30, 2020

(65) Prior Publication Data
US 2022/0329320 A1    Oct. 13, 2022

(51) Int. Cl.
*H04B 10/00*   (2013.01)
*H04B 10/079*  (2013.01)
(Continued)

(52) U.S. Cl.
CPC ......... *H04B 10/11* (2013.01); *H04B 10/0795* (2013.01); *H04W 76/14* (2018.02); *H04W 88/04* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 10,165,483 B1   12/2018  Liu et al.
10,778,330 B1    9/2020  Zoller
(Continued)

FOREIGN PATENT DOCUMENTS

CN   103237292 A    8/2013
CN   104202088 A   12/2014
(Continued)

OTHER PUBLICATIONS

Benedetto, Francsco , et al., "Dynamic LOS/NLOS Statistical Discrimination of Wireless Mobile Channels", IEEE, 2007, pp. 3071-3075.
(Continued)

*Primary Examiner* — Hanh Phan
(74) *Attorney, Agent, or Firm* — Murphy, Bilak & Homiller, PLLC

(57) ABSTRACT

Methods, apparatus and non-transitory machine-readable mediums are provided for wireless communication in communication networks enabled for wireless light communication. In one embodiment, a method is performed in a node of a communication network. The method enables data communication to be established between a first wireless device and the communication network upon a wireless Light Communication (LC) link between the first wireless device and an LC-enabled Access Point (AP) of the communication network becoming unavailable. The method comprises: identifying a second wireless device for relaying data between the first wireless device and the communication network via a first communication link between the first (Continued)

wireless device and the second wireless device and a second communication link between the second wireless device and an AP of the communication network associated with the second wireless device.

26 Claims, 12 Drawing Sheets

(51) Int. Cl.
  *H04B 10/11* (2013.01)
  *H04W 76/14* (2018.01)
  *H04W 88/04* (2009.01)
(58) Field of Classification Search
  CPC .......................... H04B 10/1149; H04B 10/40; H04B 10/2507; H04B 10/25753; H04B 10/25752; H04B 10/116; H04B 10/0795; H04W 76/14; H04Q 11/0003; H04Q 11/0005; H04Q 11/0067
  USPC ....... 398/118, 119, 127, 128, 129, 130, 131, 398/135, 136, 172, 115, 158, 159, 33, 38, 398/2, 3, 4, 5, 45, 48, 49
  See application file for complete search history.

(56) References Cited

U.S. PATENT DOCUMENTS

| | | | |
|---|---|---|---|
| 11,700,560 B2* | 7/2023 | Shiina | H04B 10/114 398/25 |
| 2003/0231584 A1 | 12/2003 | Zeitfuss | |
| 2005/0238172 A1 | 10/2005 | Tamura | |
| 2008/0032709 A1 | 2/2008 | Guvenc et al. | |
| 2014/0153923 A1 | 6/2014 | Casaccia et al. | |
| 2014/0218236 A1 | 8/2014 | Sadeghi et al. | |
| 2014/0226977 A1 | 8/2014 | Jovicic et al. | |
| 2015/0208459 A1 | 7/2015 | Kitagawa et al. | |
| 2015/0230263 A1 | 8/2015 | Roy et al. | |
| 2015/0318922 A1 | 11/2015 | Poola et al. | |
| 2016/0149302 A1 | 5/2016 | Sanderovich et al. | |
| 2016/0198474 A1 | 7/2016 | Raghavan et al. | |
| 2016/0323801 A1 | 11/2016 | Serita et al. | |
| 2017/0047994 A1 | 2/2017 | Logvinov | |
| 2017/0132852 A1 | 5/2017 | Morita et al. | |
| 2017/0202029 A1 | 7/2017 | Qi et al. | |
| 2017/0223810 A1 | 8/2017 | Bernsen et al. | |
| 2017/0302355 A1 | 10/2017 | Islam et al. | |
| 2018/0132116 A1 | 5/2018 | Shekhar et al. | |
| 2018/0219587 A1 | 8/2018 | Huo et al. | |
| 2018/0254826 A1 | 9/2018 | Jungnickel et al. | |
| 2018/0279202 A1* | 9/2018 | Tenny | H04W 40/22 |
| 2019/0110234 A1 | 4/2019 | Peisa et al. | |
| 2019/0229789 A1 | 7/2019 | Zhang et al. | |
| 2019/0319686 A1 | 10/2019 | Chen et al. | |
| 2020/0403687 A1* | 12/2020 | Raghavan | H04W 8/005 |
| 2021/0067247 A1 | 3/2021 | Liverman et al. | |
| 2023/0083292 A1* | 3/2023 | Berner | H04B 10/114 398/130 |

FOREIGN PATENT DOCUMENTS

| | | |
|---|---|---|
| CN | 103259592 B | 5/2016 |
| CN | 106656326 B | 3/2019 |
| CO | 15111422 | 5/2015 |
| EP | 2926478 A1 | 10/2015 |
| EP | 3236594 A2 | 10/2017 |
| GB | 632375 A | 11/1949 |
| JP | 2000059382 A | 2/2000 |
| JP | 2004364179 A | 12/2004 |
| JP | 2005529570 A | 9/2005 |
| JP | 2005311653 A | 11/2005 |
| JP | 2007307494 A | 11/2007 |
| JP | 2012204955 A | 10/2012 |
| JP | 2014014047 A | 1/2014 |
| JP | 2015527026 A | 9/2015 |
| JP | 2016504840 A | 2/2016 |
| JP | 2016511997 A | 4/2016 |
| JP | 2017005579 A | 1/2017 |
| JP | 2017092676 A | 5/2017 |
| JP | 2017528962 A | 9/2017 |
| JP | 2018506218 A | 3/2018 |
| JP | 2019500771 A | 1/2019 |
| JP | 2020502883 A | 1/2020 |
| KR | 20130093831 A | 8/2013 |
| TW | 201620257 A | 6/2016 |
| WO | 2014036150 A1 | 3/2014 |
| WO | 2014062714 A1 | 4/2014 |
| WO | 2015086079 A1 | 6/2015 |
| WO | 2015098311 A1 | 7/2015 |
| WO | 2015104802 A1 | 7/2015 |
| WO | 2016180497 A1 | 11/2016 |
| WO | 2017081207 A1 | 5/2017 |
| WO | 2017125747 A1 | 7/2017 |
| WO | 2017171901 A1 | 10/2017 |
| WO | 2017184190 A1 | 10/2017 |
| WO | 2018083649 A1 | 5/2018 |

OTHER PUBLICATIONS

Borras, Joan , et al., "Decision Theoretic Framework for NLOS Identification", IEEE, VTC '98, 1998, pp. 1583-1587.
Grobe, Liane, et al., "Block-Based PAM with Frequency Domain Equalization in Visible Light Communications", Globecom 2013 Workshop—Optical Wireless Communications, 2013, 1070-1075.
Kahn, Joseph M., et al., "Wireless Infrared Communications", Proceedings of the IEEE, vol. 85, No. 2, Feb. 1997, 265-298.
Komine, Toshihiko, et al., "Fundamental Analysis for Visible-Light Communication System using LED Lights", IEEE Transactions on Consumer Electronics, vol. 50, No. 1, Feb. 2004, 101-107.
Tsonev, Dobroslav, et al., "Complete Modeling of Nonlinear Distortion in OFDM-Based Optical Wireless Communication", Journal of Lightwave Technology, vol. 31, No. 18, Sep. 15, 2013, 3064-3076.
Wu, Z., et al., "Network solutions for the line-of-sight problem of new multi-user indoor free-space optical system", IET Communications, vol. 6, Issue 5, The Institution of Engineering and Technology, www/ietdl.org, 2012, 525-531.
Zhou, Zimu, et al., "WiFi-Based Indoor Line-of-Sight Identification", IEEE Transactions on Wireless Communications, vol. 14, No. 11, Nov. 2015, 6125-6136.
Silva, Bruno , et al., "IR-UWB-Based Non-Line-of-Sight Identification in Harsh Environments: Principles and Challenges", IEEE Transactions of Industrial Informatics, vol. 12, No. 3, Jun. 2016, 1188-1195.

* cited by examiner

METHODS, APPARATUS AND MACHINE-READABLE MEDIUMS RELATED TO WIRELESS COMMUNICATION IN COMMUNICATION NETWORKS

TECHNICAL FIELD

Embodiments of the disclosure relate to wireless communication in communication networks, and particularly relate to methods, apparatus and machine-readable mediums for wireless communication in communication networks enabled for wireless light communication.

BACKGROUND

Wireless Light Communication (LC) technology, which includes technologies such as Optical Wireless Communication (OWC), Visible Light Communication (VLC) and so-called "LiFi", has certain characteristics that may be considered desirable for certain cellular communication networks. For example, LC has the potential to provide very high data communication rates that are comparable to or potentially higher than anticipated radio-based 5G capabilities. Further, since the part of the spectrum used in LC is unregulated and unlicensed, deploying LC networks may in some ways be less complicated than deploying radio-based networks. Further still, there may be circumstances where existing radio-based technologies do not provide a sole or optimum solution to addressing capacity constraints and/or poor signal reception such as may occur inside buildings or where there is a high density of users attempting to access a communication network.

However, there can be circumstances where it is not possible to provide a wireless LC link between LC-enabled nodes. For example, wireless LC links rely predominantly on line-of-sight (LoS) components to achieve adequate signal-to-noise ratio. A wireless LC link provided between an LC-enabled wireless device and an LC-enabled access point may therefore be disrupted when a LoS communication path between these LC-enabled nodes is blocked. Identifying strategies for dealing with such disruptions may facilitate adoption of wireless LC technology for communication.

SUMMARY

Embodiments of the present disclosure seek to address these and other problems.

In one aspect, there is provided a method performed in a node of a communication network. The method enables data communication to be established between a first wireless device and the communication network upon a wireless Light Communication, LC, link between the first wireless device and an LC-enabled Access Point, AP, of the communication network becoming unavailable. The method comprises: identifying a second wireless device for relaying data between the first wireless device and the communication network via a first communication link between the first wireless device and the second wireless device and a second communication link between the second wireless device and an AP of the communication network associated with the second wireless device.

Apparatus and non-transitory machine-readable mediums are also provided for performing the method set out above. For example, in one aspect, a non-transitory machine-readable medium storing instructions for execution by processing circuitry of a node of a communication network is provided, the instructions being configured to cause the processing circuitry to implement the method (and other methods set out herein). In another aspect, there is provided a non-transitory machine-readable medium storing instructions for execution by processing circuitry of a node of a communication network, to enable data communication to be established between a first wireless device and the communication network upon a wireless Light Communication, LC, link between the first wireless device and an LC-enabled Access Point, AP, of the communication network becoming unavailable. Execution of the instructions by the processing circuitry cause the node to: identify a second wireless device for relaying data between the first wireless device and the communication network via a first communication link between the first wireless device and the second wireless device and a second communication link between the second wireless device and an AP of the communication network associated with the second wireless device.

Apparatus and non-transitory machine-readable mediums are also provided for performing the method set out above. For example, in one aspect, a node is provided, configured to implement the method (and other methods set out herein). In another aspect, there is provided a node, for enabling data communication to be established between a first wireless device and a communication network upon a wireless Light Communication, LC, link between the first wireless device and an LC-enabled Access Point, AP, of the communication network becoming unavailable. The node comprises processing circuitry and a non-transitory machine-readable medium, the non-transitory machine-readable medium storing instructions which, when executed by the processing circuitry, cause the node to: identify a second wireless device for relaying data between the first wireless device and the communication network via a first communication link between the first wireless device and the second wireless device and a second communication link between the second wireless device and an AP of the communication network associated with the second wireless device.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
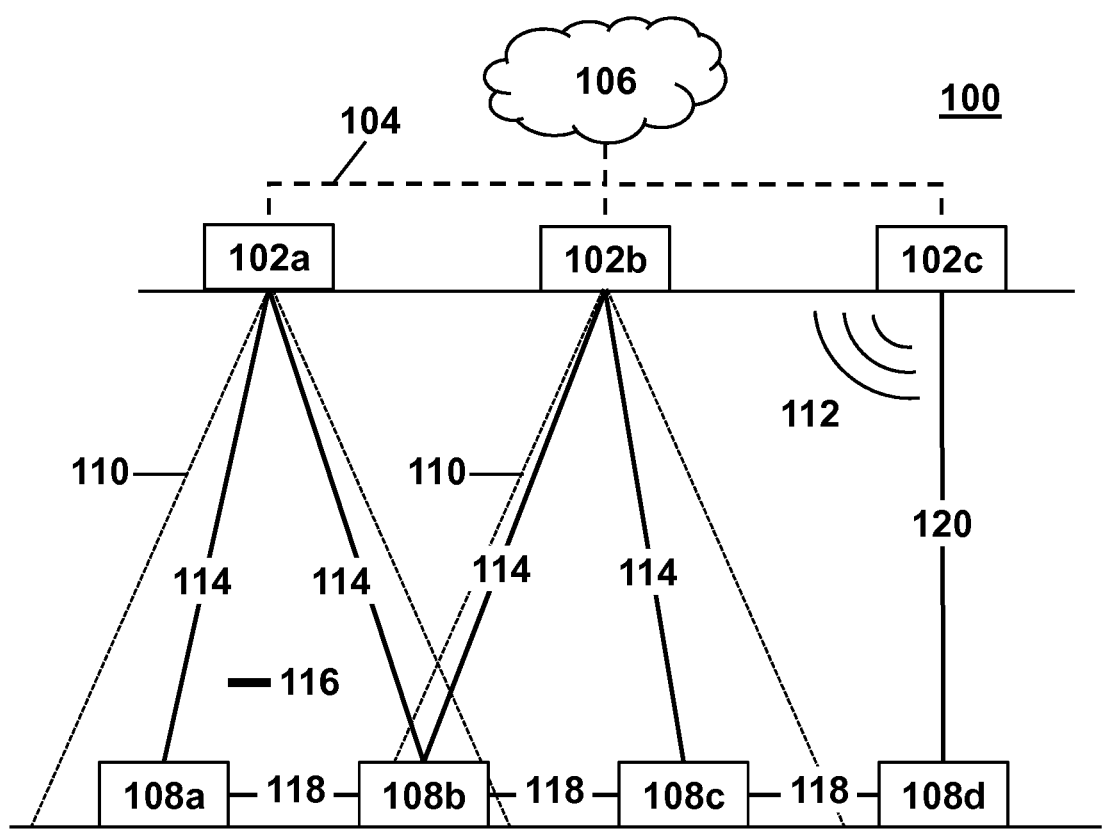
FIG. 1 is a schematic diagram showing a communication network according to embodiments of the disclosure.

Recent studies in academia and early prototypes from industry have shown that Light Communication (LC), which may include optical wireless communication (OWC), visible light communication (VLC) and so-called "LiFi", has the potential to become a new means of wireless communication. This is also the case for general light communication (LC) which deploys frequencies that do not belong to the visible optical spectrum, such as infrared light. In particular, several gigabits per second (Gb/s) are anticipated from wireless communication systems that utilize the optical (for example, visible, or the like) spectrum for communication purposes.

The main concept behind LC is to communicate binary data using rapidly varying levels of light intensity. In an example, one or multiple light emitting diodes (LEDs) are deployed in an LC-enabled transmitting device in order to modulate binary data in different levels of emitted light intensity. The deployed LEDs change the levels of the emitted light intensity at rates that may not be perceivable by the human eye. Thus, the incorporation of LC in an illumination system may not affect the quality of illumination. An LC-enabled receiving device detects the changes of the emitted light intensity using one or more photo detectors (PDs), for example. In this way, the receiving device is able to detect the transmitted data. Some LC signals may have a wavelength which is in the visible part of the spectrum, although some LC signals may additionally or alternatively have a wavelength that is non-visible (e.g., infrared or ultraviolet). The light generated by the transmitting device is subject to modulation with one or more data sources, such that the intensity of the light varies over time in a manner which can be detected and decoded by the receiving device.

A wireless LC link is dominated by a Line-of Sight (LoS) component between a transmitting device and a receiving device. When a LoS communication path is not possible between the transmitting device and the receiving device, the Signal to Interference plus Noise Ratio (SINR) of the communication is likely to decrease significantly such that a connection between the transmitter and the receiver is no longer viable for providing data communication. Therefore, if a LC-based connection is operational between a transmitting device and a receiving device, the location of the receiving device is known; that is, it may be located within a LoS of the transmitting device.

There are a number of scenarios in which a wireless LC link between two LC-enabled nodes may not be available. Such scenarios may include, for example, a blockage in the LoS communication path between LC-enabled nodes of a communication network, constraints in terms of the LC signalling range of LC-enabled nodes, a signal metric of the wireless LC link being unable to meet one or more criteria, or an error occurring in the transmission of messages between nodes of the communication network.

In the event that a wireless LC link is unavailable for any reason, embodiments described herein may provide access to a communication network so that data communication can be established. One or more technical benefits may be realised by embodiments of this disclosure. Such benefits may include, among others, reliable and/or robust data communication, distribution of network capacity across a communication network, more efficient utilisation and/or preservation of network resources, improved quality of data communication, and/or efficient energy usage across a communication network.

These and other technical benefits may be realised by one or more of the embodiments described herein.

FIG. 1 is a schematic diagram showing a communication network 100 according to embodiments of the disclosure. The illustration shows an example where the network 100 is deployed indoors (with the floor at the bottom of the page and the ceiling at the top); however, those skilled in the art will appreciate that the concepts disclosed herein are applicable to indoor and outdoor environments and the nodes of the communication network 100 are not limited to their locations depicted in the illustration.

The network 100 comprises a plurality of nodes which include a plurality of Access Points (APs) 102*a*, 102*b*, 102*c* (collectively, 102) communicatively coupled via a backhaul connection 104 to another node of the network 100 which, in this example, comprises a network node 106, which itself may comprise or be communicatively coupled to a host computer, for example. Although three APs 102 are depicted in the illustration, the network 100 may comprise one or more APs 102. At least part of the backhaul connection 104 may be provided by a wired connection, such as an Ethernet connection (e.g., power over Ethernet) or other packet data connection. Additionally or alternatively, at least part of the backhaul connection 104 may be provided by a wireless connection. The plurality of nodes of the network 100 further include a plurality of wireless devices 108*a*, 108*b*, 108*c*, 108*d* (collectively, 108) that can be communicatively coupled to the network node 106 via one or more of the APs 102. Although four wireless devices 108 are depicted in the illustration, the network 100 may comprise one or more wireless devices 108. The wireless devices 108 may alternatively be termed a user equipment (UE) or a mobile station (STA). As will be explained in more detail below, some embodiments utilize at least two wireless devices 108.

The APs 102 are configured to provide wireless access to the communication network 100 using one or both of wireless RF communication and wireless LC to provide a wireless communication link between a wireless device 108 and a corresponding AP 102. In the depicted scenario, two of the APs 102*a*, 102*b* are configured to provide respective wireless LC cells 110 that serve the wireless devices (in this case, wireless devices 108*a*, 108*b*, 108*c*) located within these two LC cells 110. An AP 102 that is capable of providing such a wireless LC cell 110 may be referred to as an "LC-enabled AP".

The other AP 102*c* is configured to provide a wireless RF cell or coverage area using a wireless RF signal 112. The AP 102*c* may provide access to the communication network 100 for any of the wireless devices 108 within RF signalling range of the AP 102*c*. For example, the wireless device 108*d* that is not located within a wireless LC cell 110 may access the communication network via the AP 102*c* using wireless RF communication. An AP 102 that is capable of providing access to the communication network 100 using wireless RF communication may be referred to as an "RF-enabled AP". An RF-enabled AP may provide an additional or alternative access mechanism to the communication network 100 if a wireless device 108 is unable to access the communication network 100 via an LC-enabled AP 102.

In the scenario depicted by FIG. 1, wireless LC links 114 are provided between the LC-enabled APs 102*a*, 102*b* and each of the corresponding wireless devices 108*a*, 108*b*, 108*c* served by the two LC cells 110. However, there may be times when at least one of these wireless LC links 114 is unavailable for some reason. For example, a blockage 116 may interrupt a Line-of-Sight (LoS) communication path between an AP 102 and a corresponding wireless device 108. Embodiments described herein may provide at least one strategy for providing a wireless device 108 with access to the communication network 100 if its wireless LC link 114 to an LC-enabled AP 102 is unavailable.

Wireless RF communication may be used to provide data communication between a wireless device 108 and a corresponding RF-enabled AP 102 of the communication network 100. For example, as depicted in FIG. 1, an RF communication link 120 may be provided between the wireless device 108d and the corresponding RF-enabled AP 102c. The RF-enabled AP 102c may provide backup access to the communication network 100 if for any reason a wireless device 108 cannot access the network via a wireless LC link or if the wireless device 108 is not capable of using LC (e.g., if the wireless device 108 is only RF-enabled, and not LC-enabled).

According to embodiments of the disclosure, data communication is further provided between the plurality of wireless devices 108 by at least one Device-to-Device (D2D) communication link 118 between first and second wireless devices 108 of the plurality of wireless devices 108. One or both of wireless RF communication and wireless LC may be used to provide these D2D communication links 118. In the scenario depicted by FIG. 1, a D2D communication link 118 is provided between the wireless devices 108a, 108b. Similarly, a further D2D communication link 118 is provided between each of the wireless devices 108b, 108c and the wireless devices 108c, 108d.

Although the APs 102 are depicted as being configured to use either wireless RF communication or wireless LC to provide a data communication link, one or more of the APs 102 may be operable to use both wireless RF communication or wireless LC in which case the AP 102 is both RF-enabled and LC-enabled. In some examples, downlink (DL) data communication between an AP 102 and a corresponding wireless device 108 may utilize one type of communication (e.g., one of: wireless RF communication and wireless LC), while uplink (UL) data communication may utilize a different type of communication (e.g., the other of wireless RF communication and wireless LC). In some examples, DL or UL communication may be provided by both wireless RF communication and wireless LC, either at different times or simultaneously. In further examples, UP and DL communications may take place with a particular wireless device 108 via different APs 102. For example, a first AP 102 may transmit signals to the wireless device in the downlink, while a second AP 102 may receive signals from the wireless device in the uplink.

Each wireless device 108 is configured to communicate wirelessly with at least one of the other nodes of the communication network 100 (e.g., the other node may be another wireless device 108 and/or an AP 102). As such, the wireless device 108 may also implement the same standard as the relevant nodes of the network 100 to which the wireless device 108 is connected.

For example, a node of the communication network 100 may be configured to provide wireless LC with another node implementing any suitable LC standard. A wireless local area network (WLAN) may be implemented to provide access to the communication network using wireless LC conforming to IEEE 802.11bb standards, for example. In an example, the node may be an LC-enabled AP 102 and the other node may be an LC-enabled wireless device 108. In another example, the node and the other node may both be LC-enabled wireless devices 108.

A node of the communication network 100 may be configured to provide wireless radio communication (e.g., using wireless RF communication) to another node implementing any suitable radio telecommunication standard. For example, the node may form part of a cellular network, and provide radio access conforming to a cellular network radio standard such as those produced by the 3$^{rd}$ Generation Partnership Project (3GPP), e.g., Global System for Mobile Communications (GSM), General Packet Radio Service (GPRS), Enhanced Data Rates for GSM Evolution (EDGE), Universal Mobile Telecommunications System (UMTS), Long Term Evolution (LTE), LTE Advanced, and the 5G standard termed New Radio (NR). Alternatively, the node may form part of a wireless local area network (WLAN), and provide radio access conforming to the IEEE 802.11 standards, for example. In this example, the node may be an RF-enabled AP 102 and the other node may be an RF-enabled wireless device 108.

RF-enabled APs 102 and RF-enabled wireless devices 108 may comprise at least one antenna or antenna element (not shown) for the transmission and/or reception of radio signals. LC-enabled APs 102 and/or LC-enabled wireless devices 108 may comprise at least one LC transmitting device (e.g. at least one light-emitting diode (LED), or the like, not shown) for transmitting LC signals. Additionally or alternatively, LC-enabled APs 102 and/or LC-enabled wireless devices 108 may comprise at least one LC receiving device (e.g. at least one photodetector, or the like, not shown) for receiving LC signals. Depending on whether a node comprises an LC transmitting device and/or an LC receiving device, that particular node may be operable to use wireless LC for data communication in one or both of the DL and the UL. For example, if an AP 102 comprises an LC transmitting device and a wireless device 108 comprises an LC receiving device, wireless LC may only be possible in the DL. In this case and if necessary, UL communications may be provided using an alternative communication link such as a wireless RF communication link with an RF-enabled AP.

Figure 2A:
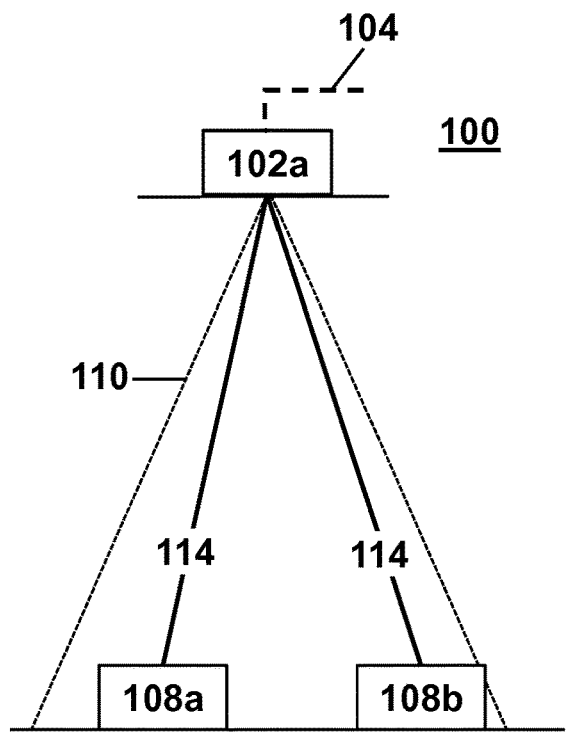
FIGS. 2a to 2b are further schematic diagrams showing a communication network according to embodiments of the disclosure.
Figure 2B:
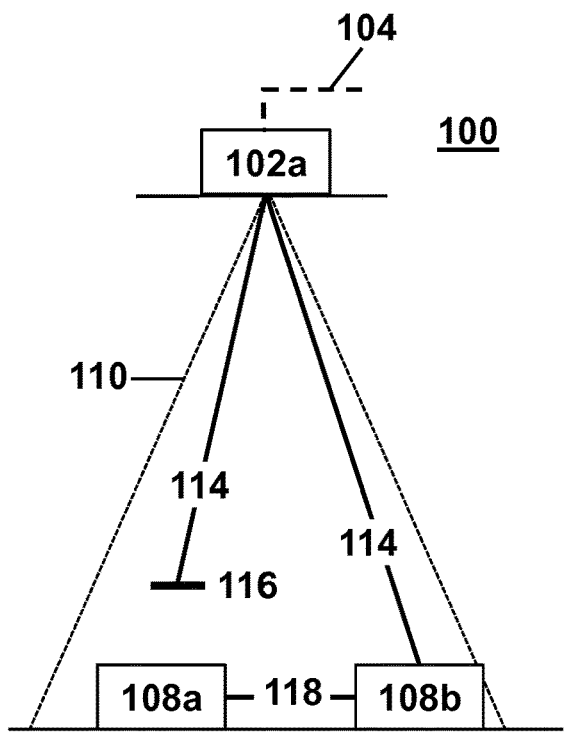

FIGS. 2a to 2b depict a part of the communication network 100 depicted in FIG. 1 in which two LC-enabled wireless devices 108a, 108b are served by the same LC cell 110. In FIG. 2a, a wireless LC link 114 is available for each of the wireless devices 108a, 108b. However, in FIG. 2b, the wireless LC link 114 between a first of the wireless devices 108a (i.e., a "first wireless device" 108) and the LC-enabled AP 102a is unavailable. In this example scenario, the unavailability of the wireless LC link 114 between the first wireless device 108 and the LC-enabled AP 102a is due to the blockage 116 in the LoS communication path therebetween.

A second of the wireless devices 108b (i.e., a "second wireless device" 108b) is identified for relaying data between the first wireless device 108a and the communication network 100 so that data can be relayed via the D2D communication link 118 (i.e., a "first communication link" 118) between the first wireless device 108a and the second wireless device 108b and the wireless LC link 114 (i.e., a "second communication link" 114) between the second wireless device 108b and the AP 102a of the communication network 100 associated with the second wireless device 108b. Thus, in this example, the second wireless device 108b is in the same LC cell 110 as the first wireless device 108a. Once the first and second communication links 118, 114 have been established, the second wireless device 108b can relay data between the first wireless device 108a and the communication network 100 via the first and second communication links 118, 114.

Throughout this disclosure, the terms "first communication link" and "second communication" link are used. However, this does not imply that there is any particular preferred order for relaying data between the first wireless device 108 and the communication network 100 via the first and second communication links 118, 114. For example, in a downlink communication from the AP 102a to the first wireless device 108a, data is transmitted from the AP 102a to the second wireless device 108b (i.e., via the "second communication link" 114), which is then relayed by the second wireless device 108b for transmission of the data to the first wireless device 108a (i.e., via the "first communication link" 118). Similarly, in an uplink communication from the first wireless device 108a to the AP 102a, data is transmitted from the first wireless device 108a to the second wireless device 108b (i.e., via the "first communication link" 118), which is then relayed by the second wireless device 108b for transmission of the data to the AP 102a (i.e., via the "second communication link" 114).

Any of the wireless devices 108 within the communication network 100 may be the "first wireless device" and any of the other wireless devices 108 may be the "second wireless device". The communication network 100 may comprise a plurality of wireless devices 108. A node of the communication network 100 may facilitate data communication by identifying a wireless device 108 within the communication network 100 to act as the "second wireless device" for a "first wireless device" when a wireless LC link 114 becomes unavailable.

Thus according to embodiments of the disclosure, data may be relayed in either direction (i.e., for uplink communications and/or downlink communications) between the first wireless device and the network via one or more second wireless devices upon the wireless LC link 114 associated with the first wireless device becoming unavailable.

Figure 3A:
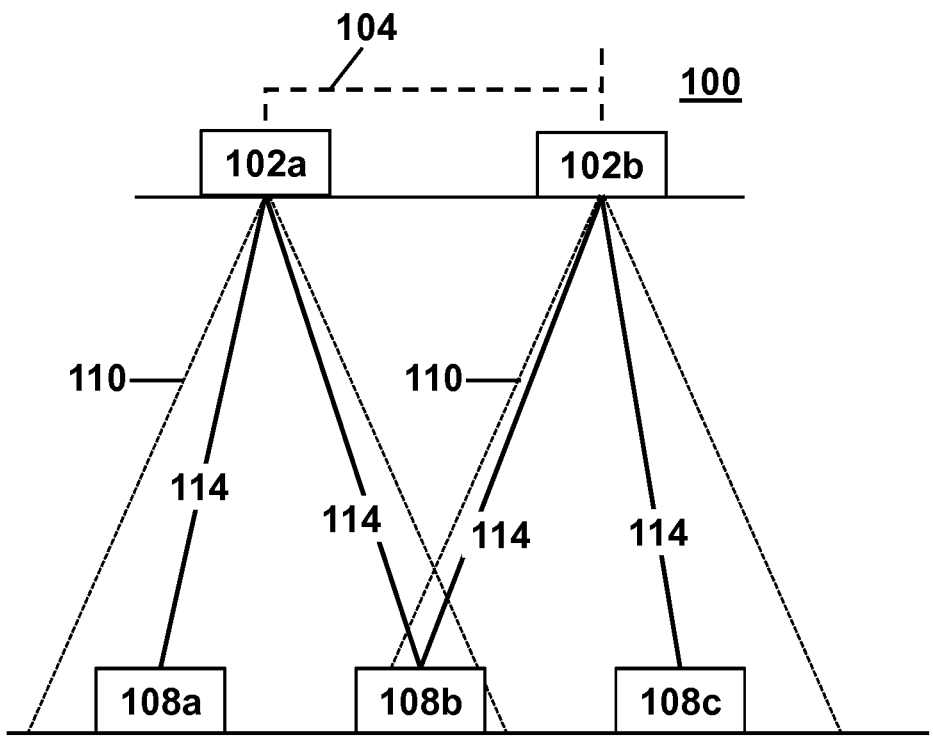
FIGS. 3a to 3d are further schematic diagrams showing a communication network according to embodiments of the disclosure.

FIGS. 3a to 3d depict parts of the communication network 100 depicted in FIG. 1 in different scenarios. FIG. 3a depicts a similar scenario to that of FIG. 2a. However, the wireless device 108b may be served by either of the LC cells 110 provided by the two APs 102a, 102b. As such, a wireless LC link 114 can be provided between the wireless device 108b and either of the APs 102a, 102b.

Figure 3B:
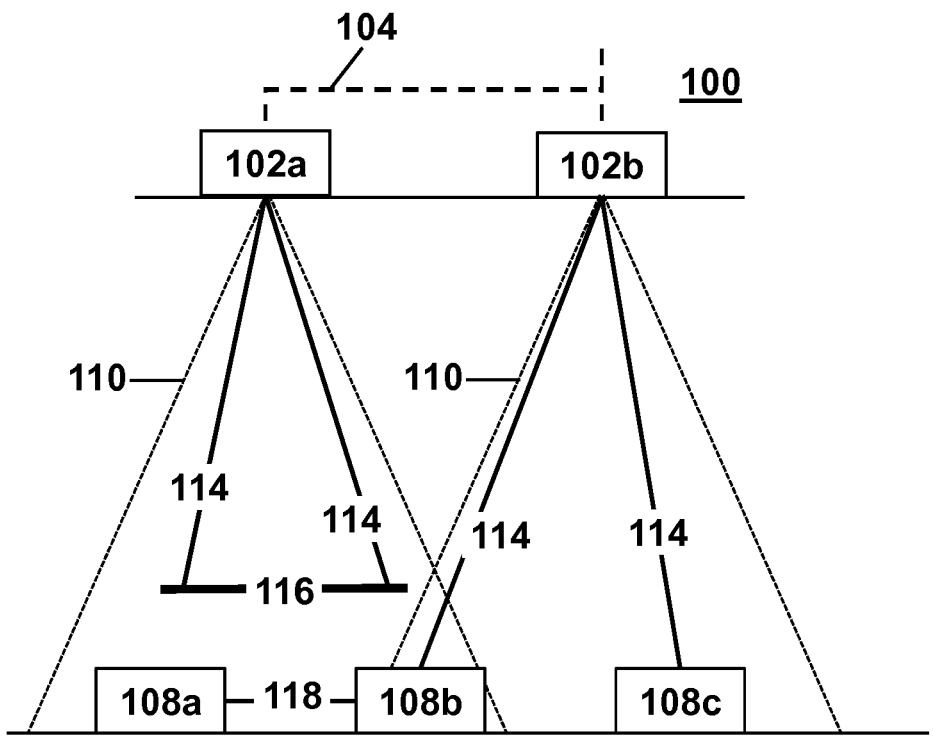

In FIG. 3b, both of the wireless LC links 114 associated with the AP 102a are unavailable (e.g., due to a blockage 116 in the LoS communication path with the AP 102a). Similar to the example of FIG. 2b, a D2D communication link 118 (i.e., a "first communication link" 118) is established between the first and second wireless devices 108a, 108b. However, in contrast to FIG. 2b, the second wireless device 108b cannot communicate with the AP 102a using light communication. Instead, the second wireless device 108b establishes a wireless LC link 114 (i.e., a "second communication link" 114) with the other AP 102b. Accordingly, once the first and second communication links 118, 114 have been established, the second wireless device 108b can relay data between the first wireless device 108a and the communication network 100 (i.e., for uplink communications and/or downlink communications) via the first and second communication links 118, 114.

Figure 3C:
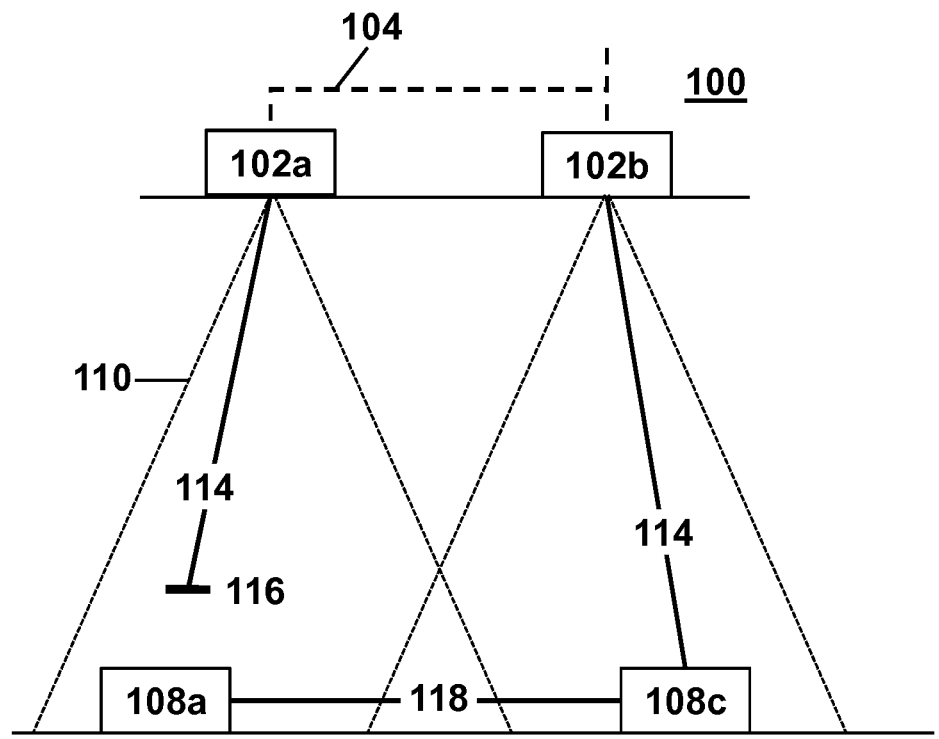

In the scenario depicted by FIG. 3c, the wireless device 108b shown in FIG. 3a is not present or is unavailable. Since the wireless LC link 114 between the first wireless device 108a and the AP 102a is once again unavailable, a second wireless device 108c is identified and a D2D communication link 118 (i.e., a "first communication link" 118) established between the first and second wireless devices 108a, 108c. In this example, the first and second wireless devices 108a, 108c are located in different LC cells 110. The second wireless device 108c establishes a second communication link 114 with the AP 102b. Accordingly, once the first and second communication links 118, 114 have been established, the second wireless device 108b can relay data between the first wireless device 108a and the communication network 100 (i.e., for uplink communications and/or downlink communications) via the first and second communication links 118, 114.

Figure 3D:
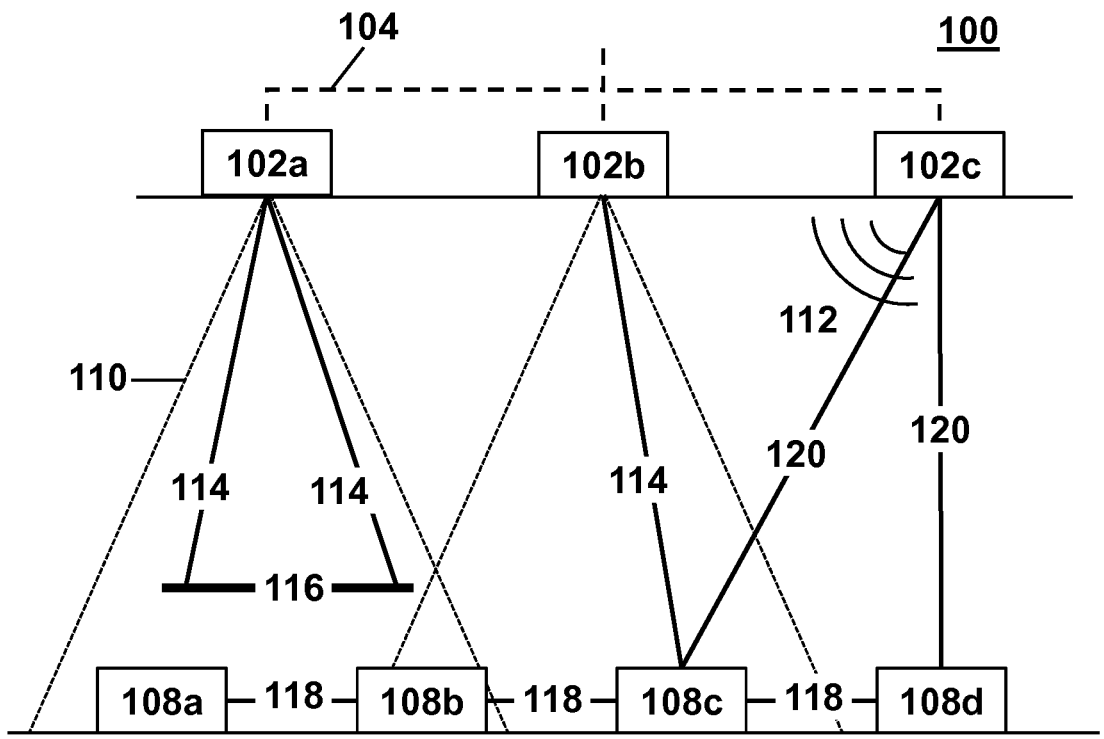

So far, a multi-hop communication link has been described in which the first and second communication links respectively represent first and second hops (or a "dual-hop" communication link) between the AP 102 and the first wireless device 108a of the communication network 100. However, the multi-hop communication link may have more than two hops (i.e., three or more hops). In FIG. 3d, there are several possible multi-hop communication links that can be established if certain wireless LC links are unavailable.

For example, a communication link may be established between the first wireless device 108a and a second wireless device 108c. A second communication link 114 may be established between the second wireless device 108c and its corresponding AP 102b so that the second wireless device 108c can relay data between the first wireless device 108a and the communication network 100 (i.e., for uplink communications and/or downlink communications). However, in this case, a direct D2D communication link cannot be established between the first and second wireless devices 108a, 108c. Therefore, another wireless device 108b enables data communication to be established between the first and second wireless devices 108a, 108c. In effect, the other wireless device 108b acts as a relay between the first and second wireless devices 108a, 108c. Accordingly, a triple-hop communication link is established between the AP 102 associated with the second wireless device 108c and the first wireless device 108a (i.e., to facilitate uplink communications and/or downlink communications).

In a related example also depicted by FIG. 3d, an RF communication link 120 (i.e., a "second communication link" 120) is instead provided between the second wireless device 108c and the RF-enabled AP 102c.

In a further related example also depicted by FIG. 3d, the second communication link 120 is provided between another wireless device 108d (i.e., a "second wireless device") and the RF-enabled AP 102c. The other wireless devices 108b, 108c relay data between the first and second wireless devices 108a, 108d in three hops.

The above examples describe scenarios where the first communication link may utilize one or both of wireless RF communication (i.e., one type of communication) and wireless LC (i.e., another type of communication). For example, in a dual-hop communication link, the first communication link may be provided by one type of communication and the second communication link may be provided by the same type of communication or another type of communication. In a multi-hop communication link with three or more hops, all three hops may be provided by the same type of communication or one or more of the hops may be provided by a different type of communication.

Figure 4:
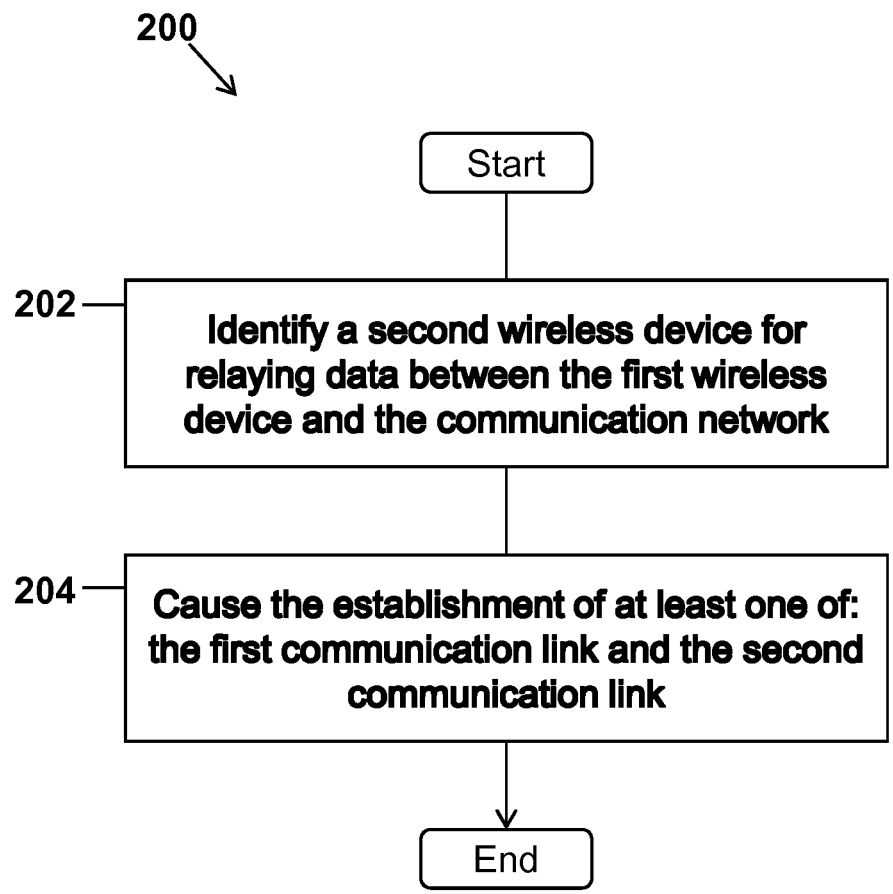
FIG. 4 is a flowchart of a method performed by a node according to embodiments of the disclosure.

FIG. 4 is a flowchart depicting a method 200 performed in a node of a communication network 100 to enable data communication to be established (i.e., for uplink communications and/or downlink communications) between a first wireless device 108 and the communication network 100 upon a wireless LC link 114 between the first wireless device 108 and an LC-enabled AP 102 of the communication network 100 becoming unavailable.

The node may be one of: the first wireless device 108; an AP 102 of the communication network 100; and the network node 106 of the communication network 100. As will be explained in greater detail below, the first wireless device 108 may itself identify a second wireless device or relay wireless device to establish a D2D communication link with, and thereafter cause the D2D communication link to be established. Alternatively, an access point may identify a second wireless device for a particular first wireless device, and cause establishment of the D2D communication link. In a further alternative embodiment, a further network node (such as the network node 106 described above with respect to FIG. 1) may cause a second wireless device to be identified and/or a D2D communication link to be established, e.g., through issuing appropriate instructions to the access point or the wireless device. In yet further embodiments, the method steps set out below may be performed by more than one of these nodes.

In block 202, a second wireless device 108 for relaying data between the first wireless device 108 and the communication network 100 is identified so that data can be relayed via a first communication link between the first wireless device 108 and the second wireless device 108 and a second communication link between the second wireless device 108 and an AP 102 of the communication network associated with the second wireless device 108.

In block 204, the node causes establishment of at least one of: the first communication link and the second communication link responsive to a determination that the wireless LC link 114 between the first wireless device 108 and the LC-enabled AP 102 has become unavailable.

In an example, for example depicted by FIG. 3d, at least one additional wireless device 108 may be identified for relaying data between the first wireless device 108 and the second wireless device 108 to enable the first communication link to be established. For example, in the event that a single (second) wireless device 108 cannot be identified for relaying data between the first and second wireless devices 108, the method may identify an alternative communication route for communicating data to improve network reliability and/or robustness, for example.

In an example, data communication via the first communication link may be enabled by at least one of: wireless Radio-Frequency, RF, communication and wireless LC. Data communication via the second communication link may be enabled by at least one of: wireless RF communication and wireless LC.

The step of identifying the second wireless device 108 may comprise selecting, based on a determination that a plurality of candidate wireless devices 108 are available for providing data communication with the communication network 100, which of the candidate wireless devices 108 to use as the second wireless device 108 according to one or more criteria. For example, in FIG. 1, a node of the communication network 100 may identify, for a first wireless device 108a, that a plurality of candidate wireless devices 108b, 108c, 108d are available for providing data communication with the communication network 100 (e.g., the candidate devices have active connections to the network). Based on the one or more criteria, the node may determine which wireless device(s) 108 of the plurality of candidate devices to use to enable the first and second communication links 118, 114, 120 to be established.

In an example, at least one of the one or more criteria is based on a location of one or more of the nodes, such as: the first wireless device 108; the LC-enabled AP 102 associated with the first wireless device 108; the candidate wireless devices 108; and/or an AP 102 associated with the candidate wireless devices 108. For example, the one or more criteria may comprise a criterion that the second wireless device 108 in closest proximity to the first wireless device 108 be selected as the relay device (e.g., to avoid interference effects or due to transmission power constraints, or the like). However, in some scenarios the closest candidate wireless device 108 may not provide an optimum solution as defined by the one or more criteria. The location of wireless devices may be determined or inferred based on an identity of the LC-enabled AP 102 to which the wireless device has an established CL communication link. As noted above, LC communication links are dominated by LoS components, such that the presence of an active LC communication link with a particular LC-enabled AP can be inferred to mean that the wireless device is within a line of sight of the AP.

In a further example, at least one of the one or more criteria is based on a metric of a signal transmitted between the nodes of the network 100. For example, the signal may be transmitted between one of: the first wireless device 108; the LC-enabled AP 102 associated with the first wireless device 108; the candidate wireless devices 108; or an AP 102 associated with the candidate wireless devices 108, and another of: the first wireless device 108; the LC-enabled AP 102 associated with the first wireless device 108; the candidate wireless devices 108; or an AP 102 associated with the candidate wireless device 108. For example, the signal metric may comprise one or more of any suitable metric, such as received signal strength, received signal quality, signal-to-noise ratio, signal-to-interference-and-noise ratio, etc.

Various scenarios have been described where different communication links can be established depending on the particular circumstances. For example, there may be circumstances where an identified candidate wireless device 108b can establish a wireless LC connection 114 with the same LC-enabled AP 102a as the first wireless device 108a. In which case, the identified candidate wireless device 108b may be selected as the second wireless device 108 for relaying data communications.

However, in some circumstances, the candidate wireless device 108b may not be able to establish such a wireless LC link 114 with the LC-enabled AP 102a. In which case, a determination may be made as to whether or not another wireless LC link can be established between the candidate wireless device 108b and another LC-enabled AP 102b (i.e., an LC-enabled AP 102b serving wireless devices with a different LC cell 110 to that of the LC-enabled AP 102a associated with the first wireless device 108a).

Where such a wireless LC link can be established, the identified candidate wireless device 108b may be selected as the second wireless device 108 for relaying data communications. However, where the wireless LC link 114 cannot be established, a determination may be made as to whether or not a wireless RF communication link can be established between a candidate wireless device 108c and an RF communication-enabled AP 102c of the communication network 100.

Where the RF communication link can be established, the candidate wireless device 108c may be selected as the second wireless device 108 for relaying data communications. However, where the RF communication link cannot be established, further attempts to establish communication using another communication link between the first wireless device and the communication network may be performed, for example, by identifying alternative candidate wireless devices 108 and associated APs 102 and/or by attempting to establish a direct LC link (i.e., without a relaying second wireless device) between the first wireless device 108a and the LC-enabled AP 102a or another LC-enabled AP 102b.

In further embodiments, the one or more criteria may relate to the capabilities of the various nodes, such as the first or second wireless devices. For example, certain wireless devices may not be capable of establishing D2D communication links. The capabilities of wireless devices may be indicated by those wireless devices to the network via transmissions to the APs 102. In another example, only some of the wireless devices 108 may be LC-enabled, and only the LC-enabled network devices 108 can form LC links with corresponding LC APs and/or other LC-enabled wireless devices 108.

As will be appreciated from the above discussion, there may be circumstances where a wireless device may be one or both of LC-enabled and RF communication-enabled. Additionally, an LC-enabled wireless device may be capable of one or both of transmitting and receiving wireless LC signals. In some cases, a wireless device may be capable of receiving LC signals but may not be capable of transmitting LC signals (in which case the wireless device may transmit using RF signals). Accordingly, a determination may be made as to whether or not LC or RF communication should be used for one or both of the first and second communication links (e.g., the determination may be made for uplink communications and/or downlink communications). For example, responsive to a determination being made that the first communication link can be provided by LC, an LC link may be established between the first wireless device and the second wireless device. However, responsive to a determination being made that the first communication link cannot be provided by LC, a wireless RF communication link may be established between the first wireless device and the second wireless device. In any case, the second communication link may be provided by LC or RF communication (again, for one or both of uplink communications and downlink communications).

Once the second wireless device has been identified, the node may cause instructions to be provided to at least one other node of the communication network 100 regarding at least one operation to be performed if a determination is made that the wireless LC link 114 becomes unavailable. In some examples, such instructions may be provided responsive to a determination that the wireless LC link 114 has become unavailable. Alternatively, such instructions may be provided prior to the wireless LC link 114 becoming unavailable. For example, the node may proactively determine a course of action to be taken by one or more of the first wireless device 108 and the candidate wireless devices 108 should the wireless LC link 114 become unavailable in the future.

The node may periodically obtain information regarding, for example, the location, signal metrics and/or a capability of at least one of: the first wireless device 108 and the candidate wireless devices 108. The node may determine from this information whether to update the instructions provided to the wireless devices 108. For example, if the location of any of the wireless devices 108 has changed, the node may re-determine which wireless device(s) 108 can be used to relay data in the event that the wireless LC link 114 is unavailable.

As noted above, DL and UL communication may be provided using the same or different communication links. For example, in the DL, the first communication link may be provided by wireless RF communication and the second communication link may be provided by wireless LC. However, in this example, either the same communication links may be used or at least one other communication link may be used for the UL. For example, the other communication link for the UL may comprise a wireless RF communication link. Even though RF network resources may be consumed in this example, demand on the communication network may be shared between the RF network resources and the LC network resources.

In an example, the wireless LC link 114 between the first wireless device 108 and the LC-enabled AP 102 may be determined to have become unavailable upon a signal metric of the wireless LC link being unable to meet one or more criteria. The one or more criteria may comprise a threshold value against which the signal metric or some other performance indicator can be compared. The signal metric may comprise at least one of: a received signal power; a Signal-to-Noise Ratio, SNR; and a received signal quality. The signal metric may monotonically increase with increasing communication link quality such that, if the signal metric is below the threshold, the wireless LC link 114 may be considered to have become unavailable.

In an example, the wireless LC link 114 between the first wireless device 108 and the LC-enabled AP 102 is determined to have become unavailable based on a determination being made that a message transmitted from a node of the communication network 100 has not been received by another node of the communication network 100, for example, within a predetermined time interval. The non-receipt of the message may be due to, for example, a partial or incomplete reception of the message and/or an error in the message if it has been at least partially received. The node that transmits the message may be one of: an AP 102 and a wireless device 108 and the node intended to receive the message may be the other one of: the AP 102 and the wireless device 108. The wireless LC link 114 may be determined to have failed or become unavailable upon multiple such failed transmissions within a particular time window, or upon a particular transmission failing even after multiple retransmissions.

Step 204 may comprise causing an association request to be sent from one of the first wireless device 108 and the second wireless device 108 to the other of the first wireless device 108 and the second wireless device 108, to enable the establishment of the first communication link 118. Responsive to receiving the association request, the other of the first wireless device and the second wireless device 108 may transmit an acknowledgement to confirm that that it has received the association request. Thereafter, the first communication link 118 may be established between the first and second wireless devices 108 so that data may be communicated therebetween.

The step of causing establishment of at least one of the first communication link 118 and the second communication link 114, 120 may be performed responsive to a determination that one or more attempts to re-establish the wireless LC link 114 have failed. For example, prior to identifying and/or establishing the first and second communication links 118, 114, 120, one or more attempts to re-establish the wireless LC link 114 may be performed.

The step of causing establishment of at least one of the first communication link 118 and the second communication link 114, 120 may be performed responsive to a determination that one or more attempts to establish a wireless LC link 114 with one or more further wireless LC-enabled APs 102 have failed. For example, prior to identifying and/or establishing the first and second communication links, one or more attempts to establish an alternative wireless LC link 114 with another LC-enabled AP 102 may be performed.

Thus, in one embodiment, the first wireless device 108 may perform a hierarchical list of actions upon failure of the wireless LC link 114. First, the first wireless device 108 may attempt to re-establish the wireless LC link 114 with the same LC-enabled AP. If that is unsuccessful, the first wireless device 108 may then attempt to establish a wireless LC link 114 with a different LC-enabled AP 102. If that is unsuccessful, the node may then cause establishment of the D2D communication link in order to relay data from the first wireless device 108 to the network. However, even then the first wireless device 108 may attempt to establish the D2D communication link in an ordered fashion. The node may first attempt to establish D2D communication links to second wireless devices 108 which are connected to the same LC cell as the original wireless LC link 114. If establishment of that or those D2D communication links fails, the node may attempt to establish D2D communication links to second wireless devices 108 connected to other LC cells.

Figure 5:
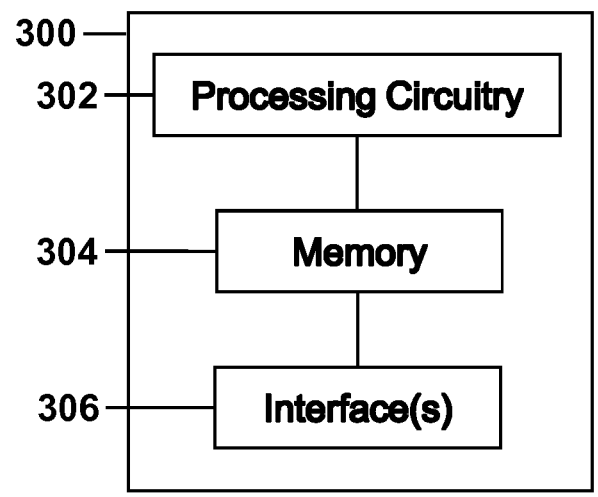
FIGS. 5 and 6 are schematic diagrams of a node according to embodiments of the disclosure.

FIG. 5 is a schematic diagram of a node 300 according to embodiments of the disclosure. The node 300 may be configured to implement any method described herein, for example, as described above with respect to FIG. 4. The communication network 100 described above comprises a plurality of nodes. The node 300 of FIG. 5 may be any of the nodes described above in relation to the communication network 100.

The node 300 comprises processing circuitry 302 (such as one or more processors, digital signal processors, general purpose processing units, etc), a machine-readable medium 304 (e.g., memory such as read-only memory (ROM), random-access memory, cache memory, flash memory devices, optical storage devices, etc) and one or more interfaces 306. The one or more interfaces 306 may comprise a plurality of antenna elements configurable to provide a plurality of transmit or receive beams (e.g. for transmitting or receiving wireless RF signals). Additionally or alternatively, the one or more interfaces 306 may comprise at least one LC receiving device and/or at least one LC transmitting device. The interface(s) 306 may additionally comprise an interface for backhaul communications, such as a wireless, wired (e.g., power-over-Ethernet) or optical interface. The components are illustrated coupled together in series; however, those skilled in the art will appreciate that the components may be coupled together in any suitable manner (e.g., via a system bus or suchlike).

The node 300 is operable to enable data communication to be established between a first wireless device 108 and a communication network 100 upon a wireless Light Communication, LC, link between the first wireless device and an LC-enabled Access Point, AP, of the communication network becoming unavailable. According to embodiments of the disclosure, the machine-readable medium 304 stores instructions which, when executed by the processing circuitry 302, cause the node 300 to: identify a second wireless device 108 for relaying data between the first wireless device 108 and the communication network 100 via a first communication link 118 between the first wireless device 108 and the second wireless device 108 and a second communication link 114, 120 between the second wireless device 108 and an AP 102 of the communication network 100 associated with the second wireless device 108.

In further embodiments of the disclosure, the node 300 may comprise power circuitry (not illustrated). The power circuitry may comprise, or be coupled to, power management circuitry and is configured to supply the components of node 300 with power for performing the functionality described herein. Power circuitry may receive power from a power source. The power source and/or power circuitry may be configured to provide power to the various components of node 300 in a form suitable for the respective components (e.g., at a voltage and current level needed for each respective component). The power source may either be included in, or external to, the power circuitry and/or the node 300. For example, the node 300 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 6:
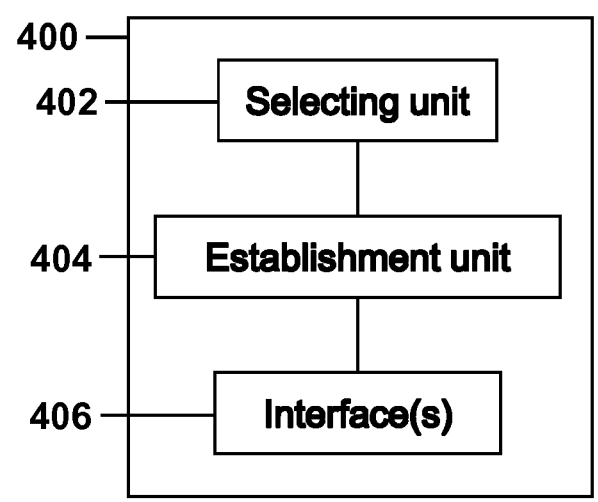

FIG. 6 is a schematic diagram of a node 400 according to embodiments of the disclosure. The node 400 may be configured to implement any method described herein, for example, as described above with respect to FIG. 4.

The node 400 comprises a selecting unit 402, an establishing unit 404 and one or more interfaces 406. The one or more interfaces 406 may comprise a plurality of antenna elements configurable to provide a plurality of transmit or receive beams (e.g. for transmitting or receiving wireless RF signals). Additionally or alternatively, the one or more interfaces 406 may comprise at least one LC receiving device and/or at least one LC transmitting device. The interfaces 406 may additionally comprise an interface for backhaul communications, such as a wireless, wired (e.g., power-over-Ethernet) or optical interface.

The node 400 is operable to enable data communication to be established between a first wireless device 108 and a communication network 100 upon a wireless Light Communication, LC, link 114 between the first wireless device 108 and an LC-enabled Access Point, AP 102, of the communication network 100 becoming unavailable. According to embodiments of the disclosure, the selecting unit 402 is configured to implement any of the methods described herein. For example, the selecting unit 402 may be configured to implement the method described in relation to block 202 of FIG. 2. According to embodiments of the disclosure, the establishment unit 404 is configured to implement any of the methods described herein. For example, the establishment unit 404 may be configured to implement the method described in relation to block 204 of FIG. 2.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 7:
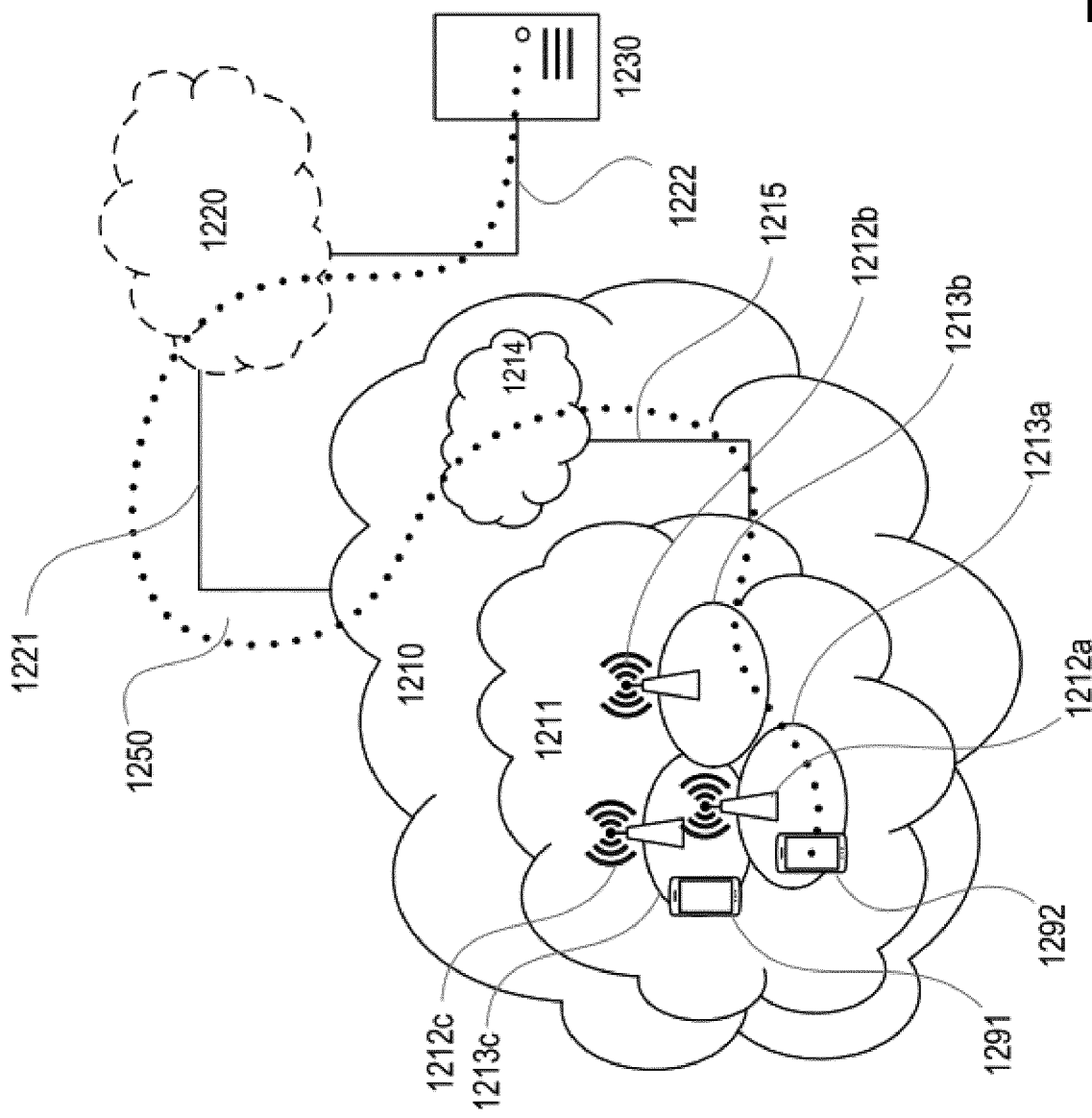
FIG. 7 shows a telecommunication network connected via an intermediate network to a host computer in accordance with some embodiments of the disclosure.

With reference to FIG. 7, in accordance with an embodiment, a communication system includes telecommunication network 1210 (which may comprise or be referred to as a communication network), such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 7 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 8. In communication system 1300 (which may comprise or be referred to as a communication network), host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 8) served by base station 1320. Communication interface 1326 may be configured to facilitate connection 1360 to host computer 1310. Connection 1360 may be direct or it may pass through a core network (not shown in FIG. 8) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 8:
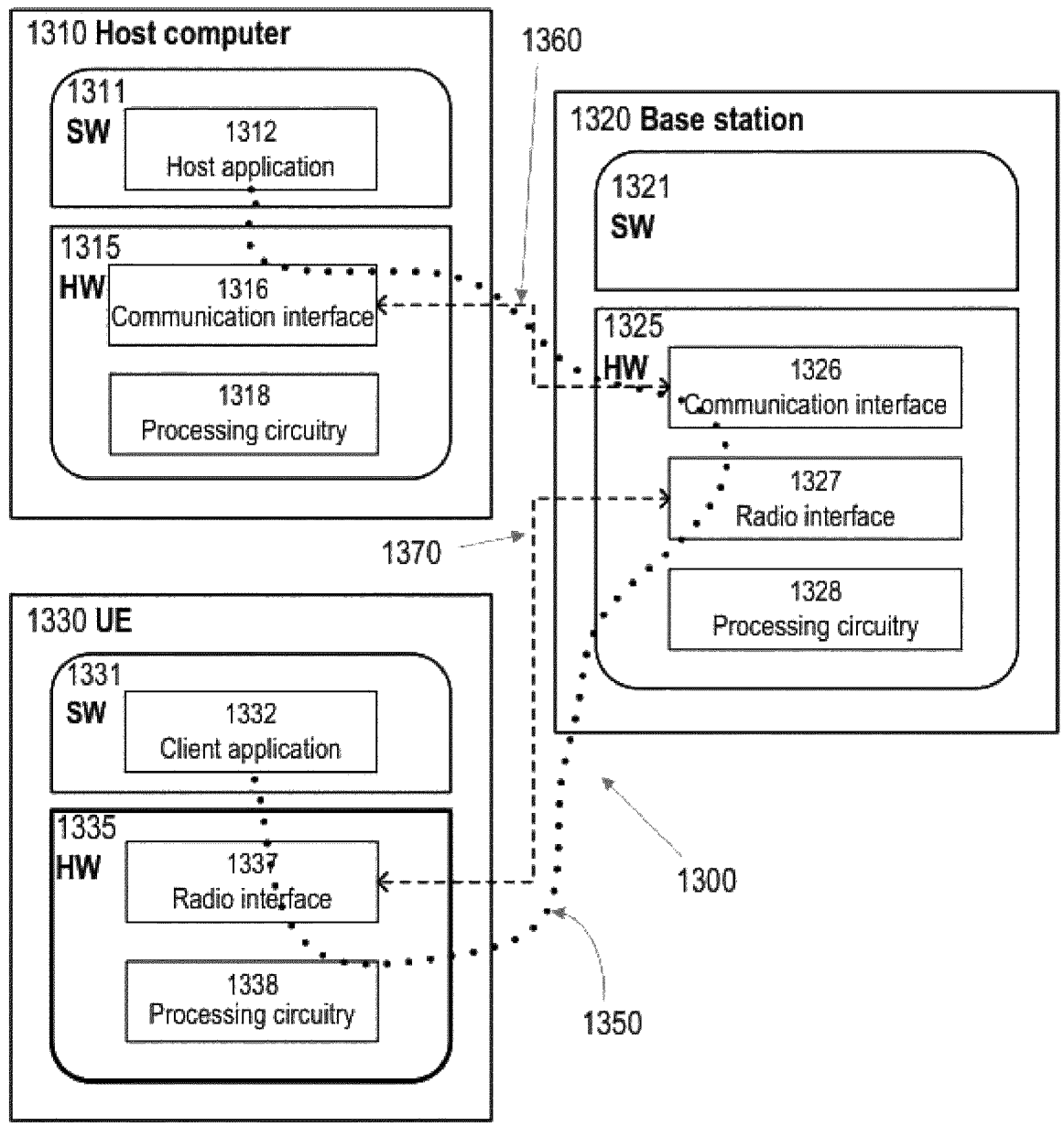
FIG. 8 shows a host computer communicating via a base station with a user equipment over a partially wireless connection in accordance with some embodiments of the disclosure.

It is noted that host computer 1310, base station 1320 and UE 1330 illustrated in FIG. 8 may be similar or identical to host computer 1230, one of base stations 1212*a*, 1212*b*, 1212*c* and one of UEs 1291, 1292 of FIG. 7, respectively. This is to say, the inner workings of these entities may be as shown in FIG. 8 and independently, the surrounding network topology may be that of FIG. 8.

In FIG. 8, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the reliability of data transmission to and from the UE 1330 and thereby provide benefits such as reduced user waiting time.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 9:
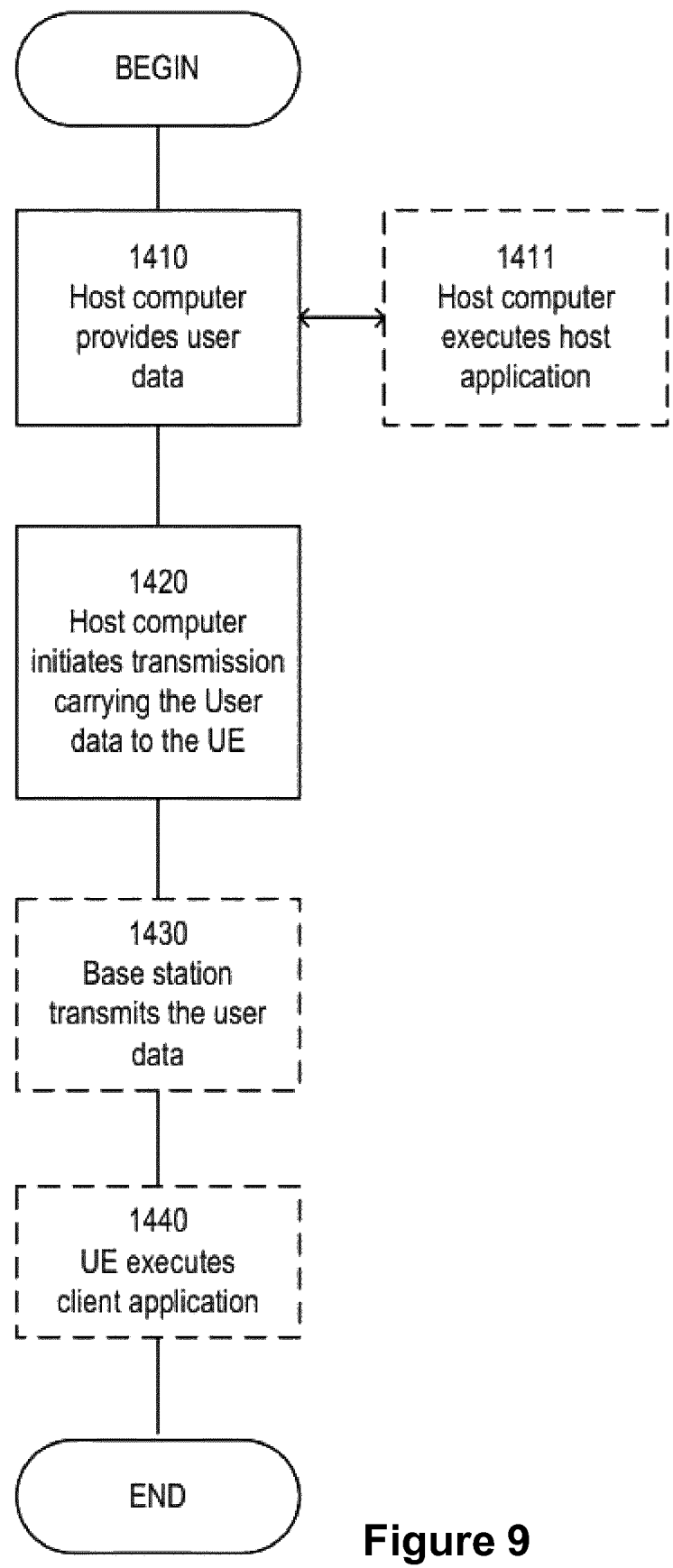
FIGS. 9 to 12 show methods implemented in a communication system including a host computer, a base station and a user equipment in accordance with some embodiments of the disclosure.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 10:
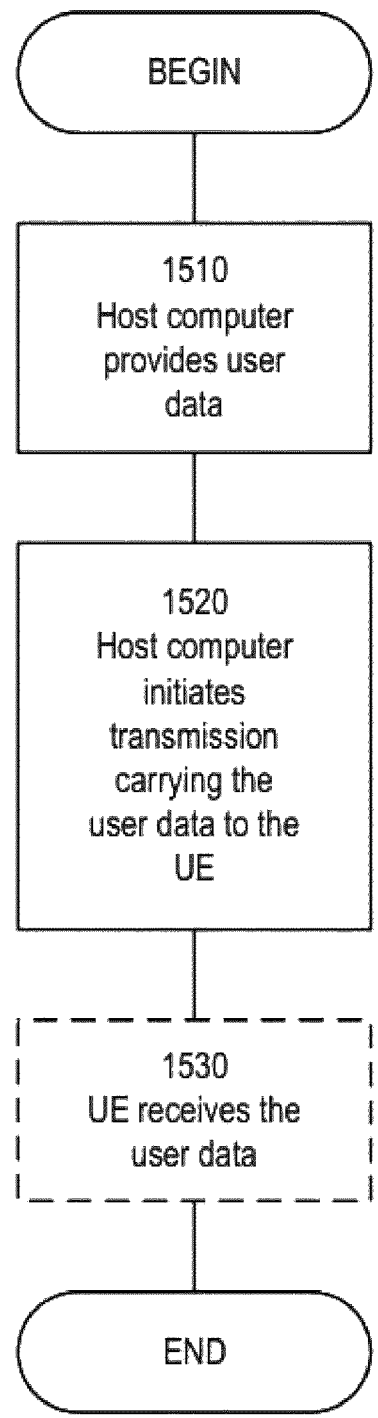

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 11:
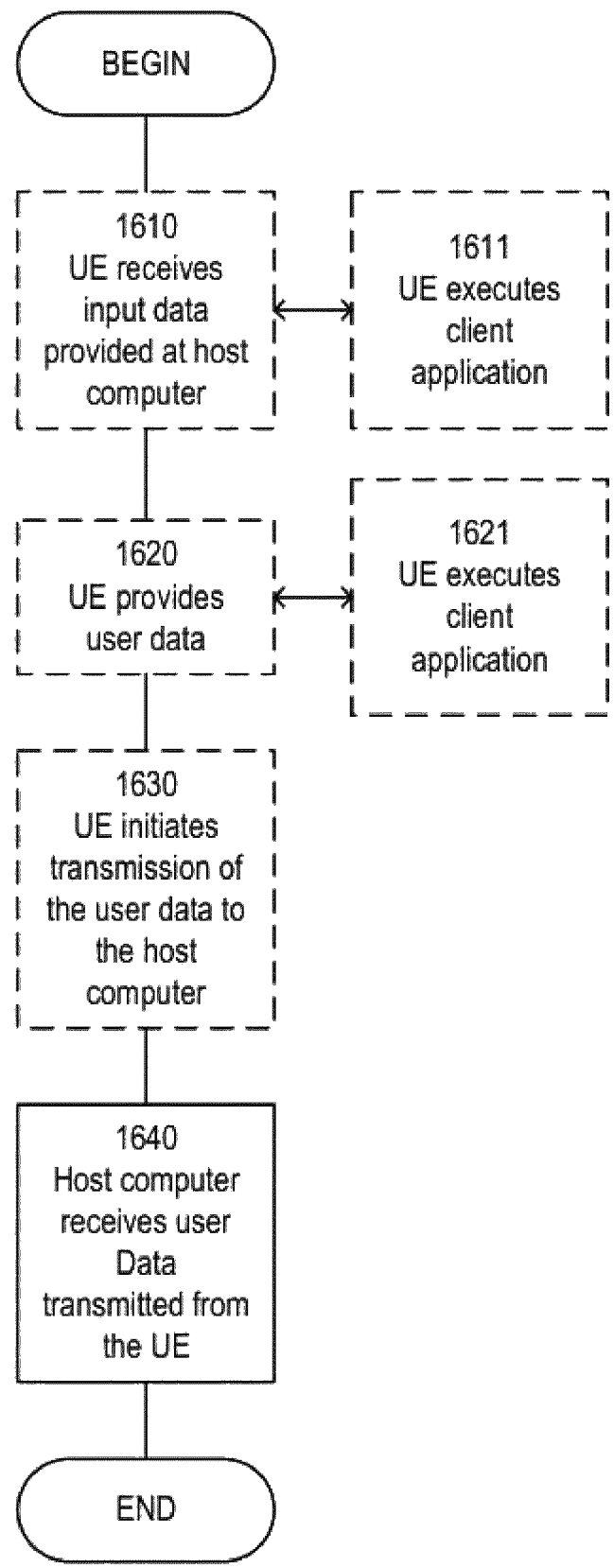

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 12:
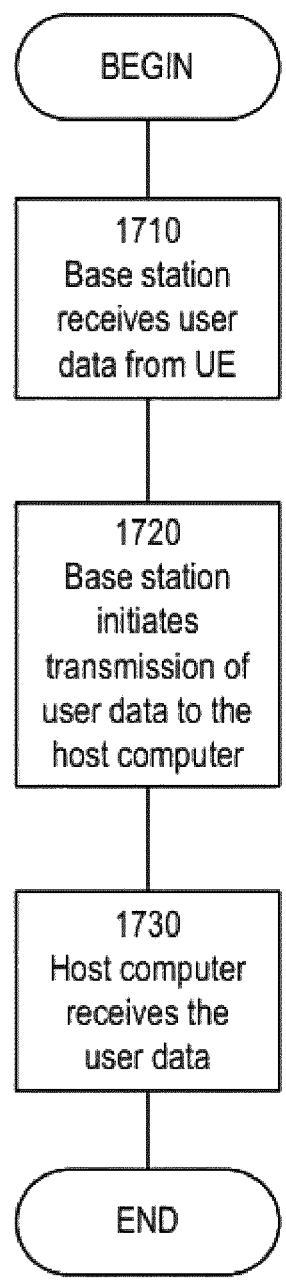

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method performed in a node of a communication network, the method enabling data communication to be established between a first wireless device and the communication network upon a wireless Light Communication (LC) link between the first wireless device and an LC-enabled Access Point (AP) of the communication network becoming unavailable, the method comprising:

responsive to a determination that the wireless LC link between the first wireless device and the LC-enabled AP becomes unavailable, identifying a second wireless device for relaying data between the first wireless device and the communication network via a first communication link between the first wireless device and the second wireless device and a second communication link between the second wireless device and an AP of the communication network associated with the second wireless device, wherein data communication via at least one of the first communication link and the second communication link is enabled by wireless Radio-Frequency (RF) communication.

2. The method of claim 1, comprising identifying at least one additional wireless device for relaying data between the first wireless device and the second wireless device to enable the first communication link to be established.

3. The method of claim 1, wherein:

data communication via one of the first communication link and the second communication link is enabled by wireless RF communication; and data communication via the other of the first communication link and the second communication link is enabled by wireless LC.

4. The method of claim 1, wherein the method comprises causing establishment of at least one of the first communication link and the second communication link responsive to a determination that the wireless LC link between the first wireless device and the LC-enabled AP has become unavailable.

5. The method of claim 4, wherein the method comprises determining the wireless LC link between the first wireless device and the LC-enabled AP to have become unavailable upon a signal metric of the wireless LC link being unable to meet one or more criteria.

6. The method of claim 5, wherein the signal metric comprises at least one of: a received signal power; a Signal-to-Noise Ratio (SNR); and a received signal quality.

7. The method of claim 4, wherein the method comprises determining the wireless LC link between the first wireless device and the LC-enabled AP to have become unavailable upon a determination being made that transmission of a message between the first wireless device and the LC-enabled AP has failed or timed out.

8. The method of claim 4, wherein causing the establishment of the first communication link comprises causing an association request to be sent from one of the first wireless device and the second wireless device to the other of the first wireless device and the second wireless device, to enable the establishment of the first communication link.

9. The method of claim 4, wherein the step of causing establishment of at least one of the first communication link and the second communication link is performed responsive to a determination that one or more attempts to re-establish the wireless LC link have failed.

10. The method of claim 4, wherein the step of causing establishment of at least one of the first communication link and the second communication link is performed responsive to a determination that one or more attempts to establish a wireless LC link with one or more further wireless LC-enabled APs have failed.

11. The method of claim 4, wherein identifying the second wireless device comprises selecting, based on a determination that a plurality of candidate wireless devices are available for providing data communication with the communication network, which of the candidate wireless devices to use as the second wireless device according to one or more criteria.

12. The method of claim 11, wherein at least one of the one or more criteria is based on a location of at least one of: the first wireless device; the LC-enabled AP associated with the first wireless device; the candidate wireless devices; and an AP associated with the candidate wireless devices.

13. The method of claim 11, wherein at least one of the one or more criteria is based on a signal metric of a wireless device transmitted between one of: the first wireless device; the LC-enabled AP associated with the first wireless device; the candidate wireless devices; or an AP associated with the candidate wireless devices, and another of: the first wireless device; the LC-enabled AP associated with the first wireless device; the candidate wireless devices; or an AP associated with the candidate wireless device.

14. The method of claim 1, comprising:

determining whether or not a wireless LC link can be established between a candidate wireless device and the LC-enabled AP associated with the first wireless device, wherein the method comprises, where the wireless LC link can be established, selecting the candidate wireless device as the second wireless device and otherwise determining whether or not another wireless LC link can be established between a candidate wireless device and another LC-enabled AP, wherein the method comprises, where the other wireless LC link can be established, selecting the candidate wireless device as the second wireless device and otherwise determining whether or not a wireless RF communication link can be established between a candidate wireless device and an RF-enabled AP of the communication network, and wherein the method comprises, where the RF communication link can be established, selecting the candidate wireless device as the second wireless device and otherwise attempting to establish communication using another communication link between the first wireless device and the communication network.

15. The method of claim 1, comprising:

responsive to a determination being made that the first communication link can be provided by LC, establishing an LC link between the first wireless device and the second wireless device; and responsive to a determination being made that the first communication link cannot be provided by LC, establishing a wireless RF communication link between the first wireless device and the second wireless device.

16. The method of claim 1, wherein the node is one of: the first wireless device; an AP of the communication network; and a network node of the communication network.

17. A non-transitory machine-readable medium storing instructions for execution by processing circuitry of a node of a communication network, to enable data communication to be established between a first wireless device and the communication network upon a wireless Light Communication (LC) link between the first wireless device and an LC-enabled Access Point (AP) of the communication network becoming unavailable, execution of the instructions by the processing circuitry causing the node to:

responsive to a determination that the wireless LC link between the first wireless device and the LC-enabled AP becomes unavailable, identify a second wireless device for relaying data between the first wireless device and the communication network via a first communication link between the first wireless device and the second wireless device and a second communication link between the second wireless device and an AP of the communication network associated with the second wireless device, wherein data communication via at least one of: the first communication link and the second communication link is enabled by wireless Radio-Frequency (RF) communication.

18. A node, for enabling data communication to be established between a first wireless device and a communication network upon a wireless Light Communication (LC) link between the first wireless device and an LC-enabled Access Point (AP) of the communication network becoming unavailable, the node comprising processing circuitry and a non-transitory machine-readable medium, the non-transitory machine-readable medium storing instructions which, when executed by the processing circuitry, cause the node to:
responsive to a determination that the wireless LC link between the first wireless device and the LC-enabled AP becomes unavailable, identify a second wireless device for relaying data between the first wireless device and the communication network via a first communication link between the first wireless device and the second wireless device and a second communication link between the second wireless device and an AP of the communication network associated with the second wireless device, wherein data communication via at least one of: the first communication link and the second communication link is enabled by wireless Radio-Frequency (RF) communication.

19. The node of claim 18, wherein the node is caused to identify at least one additional wireless device for relaying data between the first wireless device and the second wireless device to enable the first communication link to be established.

20. The node of claim 18, wherein the stored instructions are configured such that:
data communication via one of the first communication link and the second communication link is enabled by wireless Radio-Frequency (RF) communication; and
data communication via the other of the communication link and the second communication link is enabled by wireless LC.

21. The node of claim 18, wherein the stored instructions are configured to cause the node to establish at least one of the first communication link and the second communication link responsive to a determination that the wireless LC link between the first wireless device and the LC-enabled AP has become unavailable.

22. The node of claim 21, wherein the stored instructions are configured to cause the node to determine the wireless LC link between the first wireless device and the LC-enabled AP to have become unavailable upon a signal metric of the wireless LC link being unable to meet one or more criteria.

23. The node of claim 22, wherein the signal metric comprises at least one of: a received signal power; a Signal-to-Noise Ratio (SNR); and a received signal quality.

24. The node of claim 21, wherein the stored instructions are configured to cause the node to determine the wireless LC link between the first wireless device and the LC-enabled AP to have become unavailable upon a determination being made that transmission of a message between the first wireless device and the LC-enabled AP has failed or timed out.

25. The node of claim 21, wherein the stored instructions are configured to cause the node to establish the first communication link by the node causing an association request to be sent from one of the first wireless device and the second wireless device to the other of the first wireless device and the second wireless device, to enable the establishment of the first communication link.

26. The node of claim 18, wherein the node is one of: the first wireless device; an AP of the communication network; and a network node of the communication network.

* * * * *